(12) United States Patent  
Zaromb

(10) Patent No.: US 8,413,420 B1
(45) Date of Patent: Apr. 9, 2013

(54) APPARATUS AND METHODS FOR CARBON DIOXIDE CAPTURE AND CONVERSION

(76) Inventor: Solomon Zaromb, Burr Ridge, IL (US)

( * ) Notice: Subject to any disclaimer, the term of this patent is extended or adjusted under 35 U.S.C. 154(b) by 817 days.

(21) Appl. No.: 12/422,706

(22) Filed: Apr. 13, 2009

Related U.S. Application Data

(60) Provisional application No. 61/123,877, filed on Apr. 12, 2008, provisional application No. 61/127,854, filed on May 17, 2008.

(51) Int. Cl.
*F01N 3/08* (2006.01)
*B01D 53/62* (2006.01)

(52) U.S. Cl.
USPC ............... 60/274; 60/295; 205/628; 205/631; 422/178; 423/213.2; 423/230; 429/416

(58) Field of Classification Search ............... 423/230, 423/213.2; 422/178; 429/416; 60/274, 295; 205/628, 629, 630, 631, 632
See application file for complete search history.

(56) References Cited

U.S. PATENT DOCUMENTS

| | | | | |
|---|---|---|---|---|
| 2,853,367 A | * | 9/1958 | Reitzel et al. ................. | 422/179 |
| 2,942,932 A | * | 6/1960 | Elliott ............................ | 423/212 |
| 3,100,146 A | * | 8/1963 | Huntington ...................... | 95/67 |
| 3,738,088 A | * | 6/1973 | Colosimo ........................ | 96/26 |
| 4,393,652 A | * | 7/1983 | Munro ............................ | 60/295 |
| 4,436,535 A | * | 3/1984 | Erdmannsdorfer et al. ...... | 95/15 |
| 4,706,454 A | * | 11/1987 | Smith, Jr. ........................ | 60/274 |
| 5,443,804 A | * | 8/1995 | Parker et al. .................... | 423/230 |
| 5,520,894 A | * | 5/1996 | Heesink et al. ................. | 423/230 |
| 6,080,281 A | * | 6/2000 | Attia ............................. | 204/157.3 |
| 6,093,306 A | * | 7/2000 | Hanrahan et al. .............. | 205/619 |
| 6,212,882 B1 | * | 4/2001 | Greger et al. .................... | 60/274 |
| 6,280,503 B1 | * | 8/2001 | Mayorga et al. .................. | 95/96 |
| 6,632,406 B1 | * | 10/2003 | Michelin et al. .............. | 422/178 |
| 7,618,606 B2 | * | 11/2009 | Fan et al. ....................... | 423/230 |
| 7,699,909 B2 | * | 4/2010 | Lackner et al. ................. | 95/236 |
| 7,820,591 B2 | * | 10/2010 | Ryu et al. ....................... | 502/400 |
| 7,947,239 B2 | * | 5/2011 | Lackner et al. ................. | 423/220 |
| 8,016,125 B2 | * | 9/2011 | Lockledge et al. ........... | 210/504 |
| 8,114,367 B2 | * | 2/2012 | Riman et al. .................... | 423/210 |
| 2009/0232861 A1 | * | 9/2009 | Wright et al. ................. | 424/405 |

FOREIGN PATENT DOCUMENTS

WO 2005/108297 * 11/2005

* cited by examiner

*Primary Examiner* — Wayne Langel

(57) ABSTRACT

To alleviate and possibly even reverse global warming while providing a liquid fuel to replace petroleum, apparatus and methods are disclosed for capturing $CO_2$ from an air mixture and converting it to a useful substance, especially a methanol-containing fuel, utilizing preferably an MgO-loaded cartridge, which is converted partly into $MgCO_3$ as it captures $CO_2$ by a carbonation reaction and is reconverted into MgO by a calcination reaction while emitting a stream of substantially pure $CO_2$. The emitted $CO_2$ stream is reacted with hydrogen or water to yield a methanol-containing fuel or other useful chemical agent. The hydrogen is preferably derived from water electrolysis using inexpensive solar or wind driven electricity thereby also reducing the cost of such electricity by providing an economical energy storage means. Said air mixture may be the effluent from an internal combustion engine of a motor vehicle or from other fossil fuel burning sources or from the ambient atmosphere. The catalytic combination of hydrogen with $CO_2$ to form methanol can provide a new global environmentally beneficial fuel whose burning will not contribute to any net increase in the atmospheric $CO_2$ burden.

16 Claims, 3 Drawing Sheets

APPARATUS AND METHODS FOR CARBON DIOXIDE CAPTURE AND CONVERSION

Applicants claim the benefits of provisional application Nos. 61/123,877, filed Apr. 12, 2008, and 61/127,854, filed May 17, 2008, both under the same title as above. This invention relates to systems and methods for removing carbon dioxide from air and converting it to an alternative fuel, preferably methanol, so as to alleviate impending global warming and exhaustion of worldwide supplies of petroleum.

BACKGROUND OF THE INVENTION

The possibly disastrous consequences of global warming due to increasing atmospheric concentrations of carbon dioxide emanating from the burning of fossil fuels have been widely recognized in recent years, and several solvent- and sorbent-based technologies for capturing $CO_2$ emissions have been explored. State-of-the-art technology using aqueous amines for $CO_2$ capture from flue gas streams produced by existing pulverized coal (PC) burning electricity generating power plants has turned out to be too costly. Analysis conducted at the U.S. Department of Energy (DOE) National Energy Technology Laboratory (NETL) shows that $CO_2$ capture using amines and compression to pipeline pressure (80 to 140 atmospheres) raises the cost of electricity from a newly-built PC power plant by 84%, from 4.9 cents/kWh to 9.0 cents/kWh.

It is an object of our invention to provide a low-cost energy-saving method of capturing more than 90% of the $CO_2$ from flue gas streams produced by existing coal-fired electricity generating power plants and by other major $CO_2$-generating sources, such as cement production, oil and gas processing, petrochemical industry, iron and steel industry, or aluminum and other metals producers, so as to help alleviate global warming.

It is another object of our invention to provide a low-cost energy-saving method of capturing most of the $CO_2$ from flue gas streams produced by the internal combustion engines of fossil fuel-powered motor vehicles.

It is still another object of our invention to provide a method of capturing enough $CO_2$ from the atmosphere to permit prevention and possibly even reversal of global warming.

Our invention also addresses the problem of the impending exhaustion of worldwide supplies of petroleum.

In 1970, Hubbert of the U.S. Geological Survey made his famous survey of the amount of available global oil resources and estimated that it would climax at about 2000. According to recent DOE publications, the estimated climax will most likely occur in the year 2016 or at the latest in 2037, after which time impending shortages of petroleum supplies would most adversely impact most forms of transportation and most global economies.

It is therefore a further object of our invention to provide a process for generating ample supplies of a relatively inexpensive liquid fuel.

It is a still further object of our invention to effectuate major cost and energy savings by eliminating the need to compress captured $CO_2$ to pipeline pressure by converting it instead at a substantially lower pressure directly into a usable fuel, such as methanol.

It is also a further object of our invention to effectuate major cost and energy savings by eliminating the need to transport the captured $CO_2$ to a separate facility.

Recent advances in the development of solar- and wind-powered energy sources may offer environmentally clean electricity at low cost. However, a major problem with these sources is the variability of their power generation and the lack of inexpensive ways of storing energy when their available power exceeds usage demands.

It is therefore yet another object of our invention to provide an advantageous storage means for solar and wind energy by utilizing the available excess power to produce usable fuels.

More objects of the invention will become apparent to professionals in the chemical and electrical engineering, metallurgical, environmental, law enforcement, and related areas following perusal of the complete specification.

SUMMARY OF THE INVENTION

Our invention aims to prevent and possibly even reverse global warming while providing a liquid fuel to replace petroleum. $CO_2$ is captured from an air mixture and converted to a useful substance, especially a methanol-containing fuel, utilizing preferably an MgO-loaded cartridge, which is converted partly into $MgCO_3$ as it captures $CO_2$ by a carbonation reaction and is reconverted into MgO by a calcination reaction while emitting a stream of substantially pure $CO_2$. The emitted $CO_2$ stream is reacted with hydrogen or water to yield a methanol-containing fuel or other useful chemical agent. The hydrogen is preferably derived from water electrolysis using inexpensive solar, geothermal, or wind driven electricity, thereby also reducing the cost of such electricity by providing an economical energy storage means. The generated methanol can be used to refuel motor vehicles and other energy consuming systems thus providing a new global environmentally beneficial fuel whose burning will not contribute to any net increase in the atmospheric $CO_2$ burden.

Briefly, our invention consists of a three-step cycle which comprises:

i. Capturing $CO_2$ from major $CO_2$ generating sources, such as fossil fuels burning power plants, cement production, oil and gas processing, petrochemical industry, iron and steel industry, aluminum and other metals producers, as well as from fossil fuels burning motor vehicles, by passing the exhausts from these sources through comminuted MgO in packed or preferably fluidized beds, so as to yield a magnesium carbonate ($MgCO_3$) reaction product;

ii. Generating a stream of $CO_2$ by heating the $MgCO_3$ to an appropriate calcining temperature so as to reconvert it to MgO; and iii. Converting the captured $CO_2$ to a methanol-containing fuel or chemical agent by reacting it with hydrogen or water, preferably at the same sites where the $MgCO_3$ is calcined.

A similar cycle may apply to the capture of $CO_2$ from the ambient atmosphere, albeit at an as yet undetermined cost.

BRIEF DESCRIPTION OF THE DRAWINGS

The invention is best explained with reference to the drawings, in which.

DESCRIPTION OF THE PREFERRED EMBODIMENTS

Figure 1:
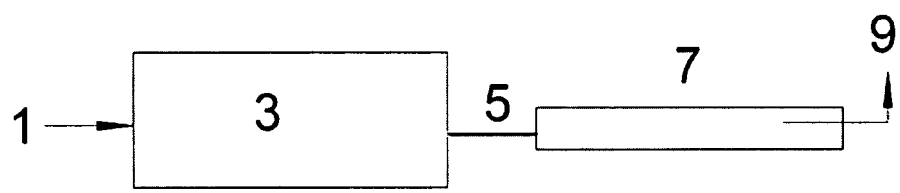
FIG. 1 is a block diagram of key elements of our invention.

In the block diagram of FIG. 1, ambient air 1 is partially converted to $CO_2$ in a fossil fuel burning source 3 whose effluents 5 are passed through a $CO_2$ capturing cartridge 7 that is loaded with highly comminuted MgO in a loosely packed fluidized bed. Effluent exit 9 from cartridge 7 may then lead to an exhaust; or to a further cleanup device (not shown) that could remove mercury, nitrogen and/or sulfur oxides and/or other harmful air pollutants; or to a generator of methanol or other useful substance. The comminuted MgO is converted partly to $MgCO_3$ via the carbonation reaction:

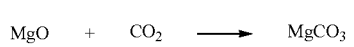

$$MgO + CO_2 \longrightarrow MgCO_3 \quad [1]$$

Since reaction rates are usually accelerated at higher temperatures, carbonation should occur fastest just below the decomposition temperature of $MgCO_3$, i.e., near 300-350 C.

Figure 2:
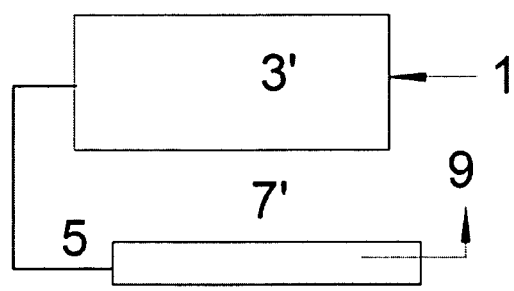
FIG. 2 is a block diagram of the elements of FIG. 1 as applied to the capture of $CO_2$ from motor vehicle exhausts.

In one embodiment of our invention represented by the block diagram of FIG. 2, the fuel burning source 3' is an internal combustion engine of a motor vehicle and the $CO_2$ capturing cartridge 7' is contained in a relatively thin removable box connected to the engine exhaust and fitted in the underside of the vehicle. Cartridge 7' is loaded with enough MgO to capture most of the $CO_2$ generated between major refuelings. For instance, an automobile consuming a gallon of gasoline per 20 miles of travel and refueling on the average after every 300 miles would require a minimum of 160 Kg of MgO, and possibly a 5-fold larger amount, or 800 Kg of MgO, which could be easily fitted into a volume of 24"×12"×2.4", as compared with base dimensions of about 200"×75" for medium-size automobiles, such as the Ford Taurus. Assuming that most of the $CO_2$ generated between major refuelings is captured by the MgO, the weight gain due to the absorbed $CO_2$ will then add about 160 kg to a fully used cartridge.

The $MgCO_3$ carbonation reaction product is then preferably reconverted to MgO at a refueling station by a calcining reaction at a temperature of 400-600 C:

$$MgCO_3 \longrightarrow MgO + CO_2 \quad [2]$$

Moreover, if the refueling station facilities can effectuate a conversion of the $CO_2$ stream from reaction 2 to methanol by a reducing reaction, such as

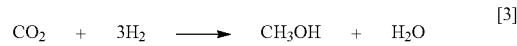

$$CO_2 + 3H_2 \longrightarrow CH_3OH + H_2O \quad [3]$$

or by a more complex reaction with water, constituting the reverse of the methanol burning reaction

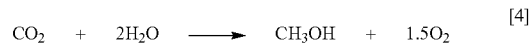

$$CO_2 + 2H_2O \longrightarrow CH_3OH + 1.5O_2 \quad [4]$$

[Olah And Prakash, U.S. Pat. No. 5,928,806, Jul. 27, 1999, Column 4, Lines 1-7 and Column 8, Lines 13-31], then the recovered $CH_3OH$-containing fuel can serve to propel vehicles powered by methanol burning fuel cells or internal combustion engines. Since the $CO_2$ produced in the burning of the methanol could be recaptured by the scheme of FIG. 2, the entire cycle would yield no net increase in atmospheric $CO_2$.

Assuming that the cost of electricity derived from sunlight or wind power will be sufficiently reduced, the envisaged refueling station could be housed in a moderately sized building in which $MgCO_3$-enriched cartridges could be calcined with electric heaters and hydrogen for reaction 3 would be generated by water electrolysis or reaction 4 would be driven by DC power supplied to reverse fuel cells.

For maximum cost effectiveness, the MgO should be preferably derived from some of its abundant minerals, including periclase (MgO) or any of its associated minerals such as brucite ($Mg(OH)_2$), magnesite ($MgCO_3$), barringtonite ($MgCO_3.2H_2O$), nesquehonite ($MgCO_3.3H_2O$), lansfordite ($MgCO_3.5H_2O$), artinite ($MgCO_3.Mg(OH)_2.3H_2O$), hydromagnestite ($4MgCO_3.Mg(OH)_2.4H_2O$), or dypingite ($4MgCO_3.Mg(OH)_2.5H_2O$), which convert to MgO upon heating to a calcination temperature of 400-600 C.

Although we found no published work on any system based on reactions 1 and 2, there have been many studies published and analyses performed on a system based on analogous reactions in which CaO is used rather than MgO [Abanades et al., "Cost Structure of a Postcombustion $CO_2$ Capture System Using CaO," Environ. Sci. Technol. 2007, 41, 5523-5527 and references cited therein]. Since MgO and CaO have very similar chemical properties, it is expected that the results obtained with the CaO—$CaCO_3$ system may apply to a large extent to MgO—$MgCO_3$, with the added benefits that reactions 1 and 2 occur at much lower temperatures than the corresponding reactions with Ca compounds.

Figure 3:
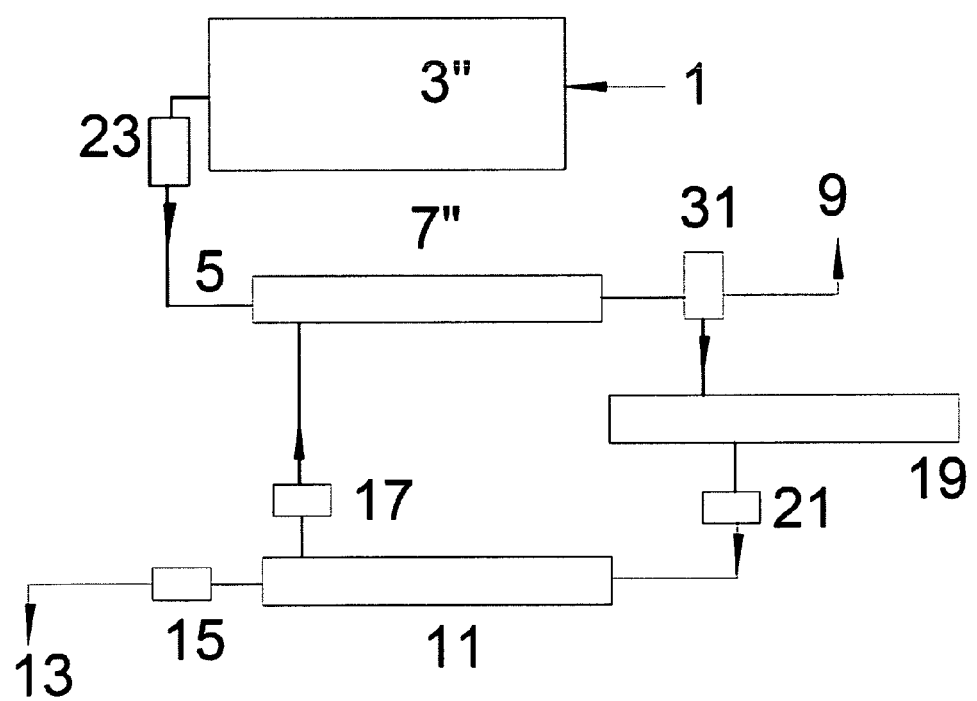
FIG. 3 is a block diagram of the elements of FIG. 1 as applied to the capture of $CO_2$ from a stationary major $CO_2$ generating source.

In an alternative embodiment of our invention represented by the block diagram of FIG. 3, the fuel burning source 3" is a stationary major $CO_2$ generator such as a coal-burning power plant. The effluents 5 from source 3" are fed through a programmable pressure booster 23 to the carbonation arm 7" of three fluidized bed containers 7", 11, and 19 which are interconnected in such a way as to permit easy transfer of carbonated $MgCO_3$-enriched contents of arm 7" first into a transfer arm 19 and hence into the calcination arm 11, wherein the transferred $MgCO_3$ is reconverted into MgO, and from which calcined MgO-loaded contents can be returned to arm 7" through programmable valve 17. To effectuate such transfers, the programmable pressure booster 23 is actuated and programmable valve 31 opened so to allow pressurized air to blow the contents of arm 7" into the transfer arm 19. A further pressure boost with programmable valves 21 and 17 opened will cause the contents of arm 19 to be transferred into calcination arm 11 and the calcined contents of arm 11 to be returned to carbonation arm 7". Following the transfers, valves 17 and 21 are closed and programmable valve 15 is opened to allow the captured $CO_2$ to be directed during calcination to a collection or reaction means via exit 13. Also reset after the transfers is programmable valve 31 so as to redirect the $CO_2$-depleted effluents to exit 9.

Figure 4:
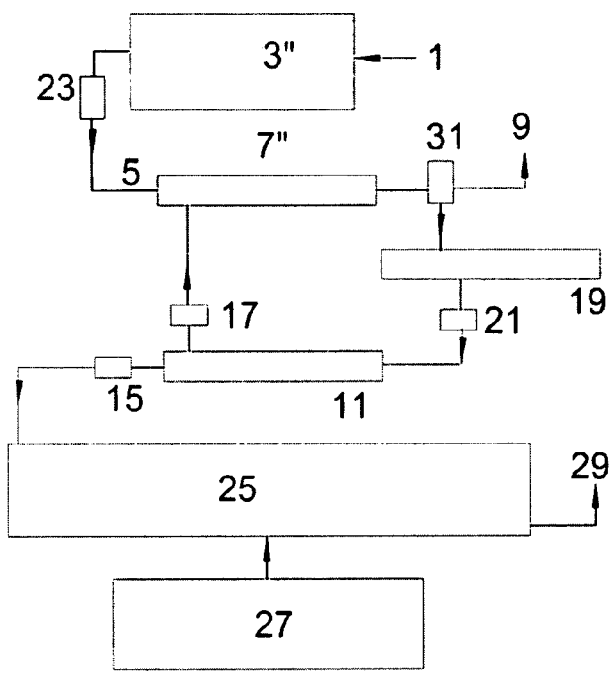
FIG. 4 is a block diagram of a system for capturing $CO_2$ and reacting it with hydrogen or water so as to convert it to a usable fuel or chemical agent, such as methanol.

The $CO_2$ generated in calcination arm 11 may be converted as presented in the block diagram of FIG. 4, where the effluent from programmable valve 15 is fed into a reactor 25 and combined with hydrogen or water, supplied from a hydrogen or water source 27, to yield methanol according to an equivalent of reaction 3 or 4. Here again, the $CH_3OH$ recovered at outlet 29 can be used as an alternative fuel to power methanol consuming fuel cells, electricity generating power plants, or other present fossil fuel burning $CO_2$ emitters.

The reactor 25 of FIG. 4 may operate on an equivalent of either reaction 3 or 4. To effectuate reaction 3, source 27 supplies hydrogen, preferably by water electrolysis, and reactor 25 may be a fixed catalyst bed continuous flow pressure reactor (up to 100 atm). A gas feed composition with the stoichiometric ratio, $H_2/CO_2=3$, is passed through the catalyst bed, such as that comprising preferably 65.8 wt. % CuO/ 26.6 wt. % ZnO/5.6 wt. % $ZrO_2$/2 wt. % Mn, which is claimed by Lachowska and Skrzypek [React. Kinet. Catal. Lett. Vol. 83, No. 2, 269-273 (2004)] to increase methanol production and exhibit remarkably high selectivity, the methanol yield increasing with temperature and pressure in the ranges of 180-220 C. and 40-80 atm. The crude methanol resulting from this process is free of by-products other than water and can easily be distilled into a pure product.

The water generated in reaction 3 could be collected and used to provide for human needs, such as drinking, washing or animal husbandry. Such usage could be of great benefit in areas where there may be plenty of sea water available for generating hydrogen by electrolysis, but where potable water may be scarce, e.g., in desert areas near sea shores.

To effectuate reaction 4, source 27 supplies water, and reactor 25 may be the fuel cell of U.S. Pat. No. 5,599,638 operated in reverse, in which $CO_2$ is reduced preferably on a carbon-supported silver cathode, with water oxidation achieved at a Pt/C anode, requiring a reverse cell voltage of about 2 volts [Olah and Prakash, U.S. Pat. No. 5,928,806, Jul. 27, 1999].

Figure 5:
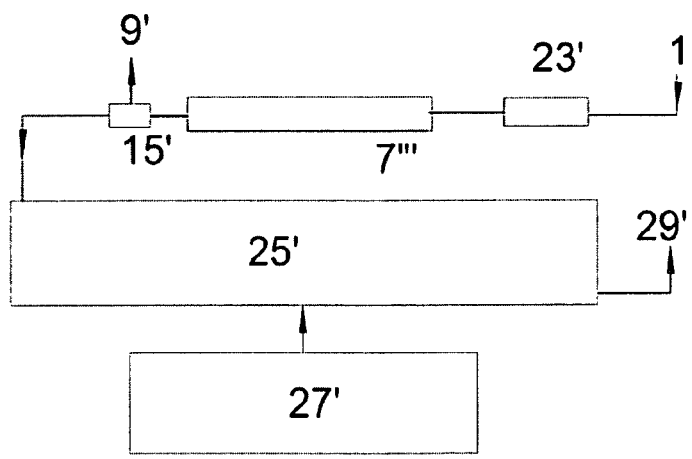
FIG. 5 is a block diagram of the elements of FIG. 1 as applied to the capture of $CO_2$ from the ambient atmosphere and its conversion to a usable fuel or chemical agent, such as methanol.

A still other embodiment of our invention addresses a possible need to capture enough $CO_2$ from the atmosphere to permit prevention and possibly even reversal of global warming. As indicated in the block diagram of FIG. 5, ambient air 1 is drawn through a pumping and cyclonic pre-cleaning means 23' which causes particulates-depleted air to pass through an MgO-loaded cartridge 7''' and hence through programmable valve 15' to exhaust 9'. After a sufficient portion of the MgO is converted to $MgCO_3$, which can be estimated by the $CO_2$ content of the ambient air and timed accordingly, means 23' is shut down, cartridge 7''' is heated to a calcination temperature of 400-600 C. and valve 15' is switched to allow the generated $CO_2$ stream to flow into an activated reactor 25', where it is converted to a methanol-containing fuel just as in the embodiment of FIG. 4. When the $CH_3OH$ recovered at outlet 29' comes down to a trickle, reactor 25' is deactivated, valve 15' is reset to divert the effluent from cartridge 7''' to exhaust to the surroundings, and means 23' is re-activated to resume the $CO_2$-capture process.

There will now be obvious many variations and modifications of the afore-disclosed embodiments to persons skilled in the art. It will be obvious that similar approaches can apply to the capture and conversion of $CO_2$ from the smoke stacks of residential and office buildings, of various small industrial facilities, and other distributed small scale fuel burning sources. All these variations will fall within the scope of our invention if covered by the following claims.

I claim:

1. Apparatus for capturing carbon dioxide from motor vehicle exhausts which comprises:
   means for installing a cartridge loaded with a reversible $CO_2$-capturing agent in a motor vehicle and connecting it to the outlet of the vehicle's fuel combustion source so as to cause the effluent of said source to pass through said cartridge;
   means for removing a $CO_2$-enriched cartridge from said vehicle and replacing it by a fresh cartridge;
   means for treating said $CO_2$-enriched cartridge so as to form a stream of concentrated carbon dioxide and regenerate a fresh $CO_2$-capturing cartridge;
   means for supplying hydrogen or water to a reactor; and
   means for reacting said hydrogen or water with said stream of carbon dioxide in said reactor so as to form a liquid fuel for powering a motor vehicle.

2. Apparatus of claim 1, wherein:
   said $CO_2$-capturing agent is MgO; and said treating means is a means of calcining $MgCO_3$-enriched cartridges.

3. Apparatus of claim 2 wherein said liquid fuel comprises methanol.

4. Apparatus of claim 3 wherein said hydrogen is generated by water electrolysis.

5. Apparatus of claim 3, wherein said means for reacting is a water and $CO_2$ consuming electrochemical cell.

6. The apparatus of claim 5 wherein said electrochemical cell comprises a carbon-supported silver cathode for reducing $CO_2$ and a Pt/C anode for water oxidation.

7. Apparatus of claim 1 which comprises:
   means for passing said mixture through a packed or fluidized bed of comminuted magnesium oxide or magnesium oxide-containing mineral so as to react said carbon dioxide therewith to form magnesium carbonate;
   means for generating a concentrated stream of carbon dioxide by heating said carbonate to a calcining temperature; and
   means for either sequestering said stream or converting it to a usable product.

8. Apparatus of claim 7, wherein said substance is a methanol-containing fuel or chemical agent.

9. Apparatus of claim 8, wherein said air mixture is an effluent of an internal combustion engine.

10. Apparatus of claim 8 which comprises:
    means for utilizing excess energy generated by transient power sources, such as those deriving from winds or sunlight,
    means for capturing carbon dioxide from motor vehicle exhausts and recovering it in form of a concentrated stream; and
    means for reacting said carbon dioxide stream with hydrogen so as to yield a storable methanol-containing fuel or other usable product.

11. A method of capturing carbon dioxide from a volume of an air mixture, which comprises the steps of:
    passing said mixture through a packed or fluidized bed of comminuted magnesium oxide or magnesium oxide containing mineral so as to react said carbon dioxide therewith to form magnesium carbonate;
    generating a concentrated stream of carbon dioxide by heating said carbonate to a calcining temperature; and
    either sequestering said stream or converting it to a usable product,
    wherein said air mixture is an effluent of a motor vehicle exhaust,
    enclosing said bed within a removable cartridge connected to said motor vehicle exhaust;
    and providing a refueling station wherein a $CO_2$-enriched cartridge can be disconnected from said exhaust and replaced by a $CO_2$-depleted cartridge, and wherein the $CO_2$ from said enriched cartridge can be collected and converted into a methanol-containing fuel or other usable product.

12. The method of claim 11 wherein said effluent derives from the burning of a methanol-containing fuel.

13. The method of claim 12 wherein said methanol-containing fuel derives from captured $CO_2$.

14. The method of claim 11 which comprises alleviating or even reversing global warming by capturing carbon dioxide from air and converting it into a methanol-containing fuel, and using said methanol-containing fuel to power motor vehicles, so as to yield no net increase in atmospheric carbon dioxide from the burning of said fuel.

15. The method of claim 14 which comprises deriving said methanol-containing fuel from the reaction of the captured carbon dioxide with hydrogen generated by electrolysis of water, the power for said electrolysis deriving from transient energy generating sources, thereby providing an economical means for storing said transient energy and thus reducing its costs.

16. The method of claim 15 which comprises collecting the water that is generated by said reaction and using it to provide for human needs.

\* \* \* \* \*

UNITED STATES PATENT AND TRADEMARK OFFICE
CERTIFICATE OF CORRECTION

| | | |
|---|---|---|
| PATENT NO. | : 8,413,420 B1 | Page 1 of 1 |
| APPLICATION NO. | : 12/422706 | |
| DATED | : April 9, 2013 | |
| INVENTOR(S) | : Solomon Zaromb | |

It is certified that error appears in the above-identified patent and that said Letters Patent is hereby corrected as shown below:

On the title page

Item 12 should read: Zaromb, et al.

Item 76 INVENTOR(S) should read: Solomon Zaromb, Burr Ridge, IL (US); John O'Mara Bockris, Gainesville, FL (US)

In the claims

Column 5, line 60, "I claim:" should be changed to --We claim:--

Signed and Sealed this
Eleventh Day of June, 2013

Teresa Stanek Rea
*Acting Director of the United States Patent and Trademark Office*